United States Patent [19]

Antonoplos et al.

[11] 4,218,555

[45] Aug. 19, 1980

[54] PROCESS FOR PREPARATION OF ACETYLENE END-CAPPED POLYIMIDE OLIGOMERS

[75] Inventors: Patricia A. Antonoplos; Clarence D. Bertino; William J. Heilman, all of Houston, Tex.

[73] Assignee: Gulf Oil Corporation, Pittsburgh, Pa.

[21] Appl. No.: 956,708

[22] Filed: Nov. 1, 1978

[51] Int. Cl.$^2$ .................... C08G 73/10; C08G 73/12
[52] U.S. Cl. .................... 528/126; 260/326 S; 260/326 NS; 260/326 A; 526/259; 526/285; 528/125; 528/128; 528/170; 528/172; 528/179; 528/187; 528/188; 528/192; 528/220; 528/222; 528/226; 528/229; 528/323; 528/351; 528/352; 528/353; 560/11; 560/18; 560/19; 560/45; 560/47; 560/52; 560/64; 560/65; 560/66; 560/76

[58] Field of Search ............... 528/187, 188, 192, 179, 528/125, 126, 128, 172, 170, 220, 222, 226, 229, 322, 351, 352, 353; 526/259, 285; 260/326 S, 326 NS, 326 A; 560/11, 18, 19, 45, 47, 52, 64, 65, 66, 76

[56] References Cited

U.S. PATENT DOCUMENTS

| | | |
|---|---|---|
| 3,845,018 | 10/1974 | Bilow et al. .................... 528/192 |
| 3,879,349 | 4/1975 | Bilow et al. .................... 528/188 |
| 3,998,786 | 12/1976 | D'Alelio .................... 528/188 |
| 4,108,836 | 8/1978 | Bilow .................... 528/128 |

*Primary Examiner*—Lester L. Lee
*Attorney, Agent, or Firm*—Richard L. Kelly

[57] ABSTRACT

Acetylene end-capped polyimide oligomers are prepared by a process including the following sequential steps:

1. Preparing an alkanol or ether solution containing substantially 1 molar equivalent of a dialkyl ester of an aromatic tetracarboxylic acid,
2. Adding substantially 0.5 to 0.8 molar equivalent of an aromatic diamine to the solution of (1) to form a reaction product between the diacid and the diamine,
3. Adding an aminoarylacetylene to the solution of (2) in a quantity sufficient to provide amine groups equivalent to the free carboxylic acid groups present in the product of (2).
4. Heating the solution of (3) to vaporize the solvent therefrom, and
5. Heating the product of (4) to convert the carboxylic acid groups, the ester groups, and the amino groups thereof to imide groups.

The temperature in steps (2) and (3) is maintained below about 50° C. The temperature in steps (4) and (5) is maintained below about 210° C.

15 Claims, 3 Drawing Figures

PROCESS FOR PREPARATION OF ACETYLENE END-CAPPED POLYIMIDE OLIGOMERS

BACKGROUND OF THE INVENTION

The prior art, notably U.S. Pat. No. 3,845,018 to N. Bilow et al, and U.S. Pat. No. 3,879,349, also to N. Bilow et al, discloses certain acetylene end-capped polyimide oligomers and describes methods for their preparation. The polyimide oligomers are useful as heat-curable coatings on wires or other substances, as laminating resins, and as molding resins. Laminates and moldings prepared from such oligomers have low void contents as well as excellent thermal and physical properties.

The reported processes for preparing such products are inefficient and costly. In the firste step of the process, an aromatic tetracarboxylic and dianhydride is reacted with an aromatic diamine to form an anhydride capped polyamic acid. This intermediate product then is reacted with an aminoarylacetylene to product an acetylene-capped polyamic acid. A solvent which will form an azeotrope with water, e.g., benzene, or react with water, e.g., acetic anhydride, is added to the acetylene capped polyamic acid product and the midture is heated to remove water from the amic acid groups to form imide groups. This reaction is run under reflux conditions with water being removed to drive the reaction to completion. The aromatic tetracarboxylic anhydride and the polyimide formed in the reaction both have low solubilities in common solvents and for this reason it is necessary to employ special high boiling solvents such as dimethyl formamide (DMF) or N-methyl-2-pyrrolidone (NMP) in the process.

In addition to their high cost, the prior art processes produce products having recognized deficiencies. Specifically, the high boiling solvents employed in the processes are difficult to remove completely. Unless removed virtually completely, residual solvent evolves when the acetylene end-capped polyimide oligomers are cured. This action causes moldings prepared from such oligomers to fracture.

For the above reasons, there is a need in the art for an improved process for the manufacture of acetylene end-capped polyimide oligomers.

SUMMARY OF THE INVENTION

Acetylene end-capped polyimide oligomers are prepared by a process including the following sequential steps:
1. Preparing an alkanol or ether solution containing substantially 1 molar equivalent of a dialkyl ester of an aromatic tetracarboxylic acid,
2. Adding substantially 0.5 to 0.8 molar equivalent of an aromatic diamine to the solution of (1) to form a reaction product between the diacid and the diamine,
3. Adding an aminoarylacetylene to the solution of (2) in a quantity sufficient to provide amine groups equivalent to the free carboxylic acid groups present in the product of (2).
4. Heating the solution of (3) to vaporize the solvent therefrom, and
5. Heating the product of (4) to convert the ester and amino groups thereof to imide groups.

The temperature in steps (2) and (3) is maintained below about 50° C. The temperature in steps (4) and (5) is maintained below about 210° C.

DETAILED DESCRIPTION OF THE INVENTION

An essential feature of the invention is the discovery that an aromatic diamine (hereinafter frequently referred to as the A moiety), a dialkyl ester of an aromatic tetracarboxylic acid (hereinafter frequently referred to as the B moiety), and an aminoaryl acetylene (hereinafter frequently referred to as the C moiety) will react together in a low boiling alkanol or ether to form a reaction product which is quite soluble in this solvent. It is believed that the reaction product is a complex formed by salt formation between the amine groups of the A and C moieties and the carboxylic acid groups of the B moiety. The structure of this reaction product can be represented by the formula:

$$C-B-(A-B)_n-C \qquad (1)$$

wher A, B, and C have the structure subsequently defined and n is a small integer having a value from 1 to about 4.

When A, B, and C are reacted in a 0.5/1.0/1.0 molar ratio, the reaction product can be represented by the formula:

$$C-B-A-B-C \qquad (2)$$

Figure 1:
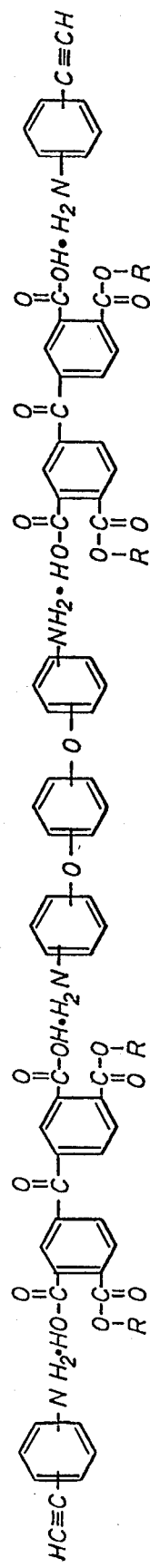
FIGS. 1 and 2 represent structural formulas of two typical intermediate products produced in the process of the invention.

In the special case when the A moiety is a 1,3-bis-(aminophenoxy)benzene, the B moiety is a dialkyl ether of 3,3', 4,4'-benzophenone tetracarboxylic acid, and the C moiety is an aminophenylacetylene, the intermediate product has the structure shown in FIG. 1.

A second essential feature of the invention is the discovery that the intermediate reaction products of formulas (1) and (2) can be heated under controlled conditions to convert their amine, carboxylic acid and ester groups to imide groups. The final products are acetylene end-capped polyimides which are virtually indistinguishable from the corresponding products prepared by prior art processes. The products produced by the process of the present invention, however, are essentially free of occluded solvent which causes problems in the molding of products prepared by the prior art processes.

The solvents employed in the process can be lower alkanols containing up to about 5 carbon atoms and lower ethers containing up to about 6 carbon atoms. Suitable solvents have atmospheric boiling points of less than 150° C. and include methanol, ethanol, isopropanol, diisopropyl ether, ethylene glycol monomethyl ether, and the like.

The aromatic diamine employed in the process, i.e., the A moiety, has the structure:

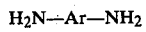

$$H_2N-Ar-NH_2$$

where Ar is a phenyl or naphthyl group, or

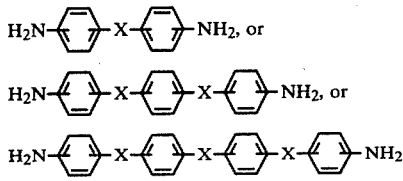

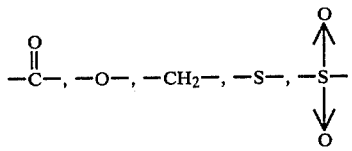

where X is

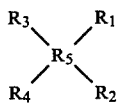

—CF$_2$—, or a bond.

Examples of suitable diamines include meta and paraphenylene diamine, 1,7—naphthyl diamine, 4,4'—methylene dianiline and 4,4'—oxydianiline. The presently preferred aromatic diamines are the bis (aminophenoxy) benzenes (APB), and preferably 1,3-bis (3-aminophenoxy) benzene. Such compounds are known and reported in the art.

The dialkyl ester of the aromatic tetracarboxylic acid employed in the process, i.e., the B moiety, has the structure:

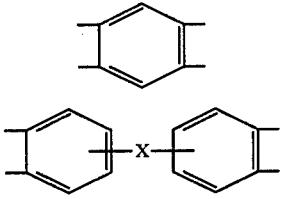

where R$_5$ has the structure: or

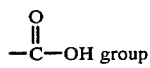

where X is as previously defined, where one of R$_1$ and R$_2$ and one of R$_3$ and R$_4$ is a $$\overset{O}{\underset{\|}{-C}}-OH \text{ group}$$

and the other is a $$\overset{O}{\underset{\|}{-C}}-OR_6 \text{ group,}$$

where R$_6$ is a lower alkyl group containing up to 5 carbon atoms. Three possible isomers exist for each dialkyl ester as R$_1$ and R$_3$, or R$_2$ and R$_4$, or R$_1$ and R$_4$ may be the same substituent groups. Each of the esters functions as the equivalent of the others in the process of the invention. The dialkyl esters preferably are prepared by reacting 1 mol of the dianhydride of the desired aromatic tetracarboxylic acid with 2 mols of a lower alkanol containing up to 5 carbon atoms. An excess of the alkanol can be used as the reaction solvent.

The aminoaryl acetylene employed in the process, i.e., the C moiety, has the structure:

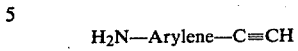

Where Arylene is a phenylene group, a naphthalene group, or

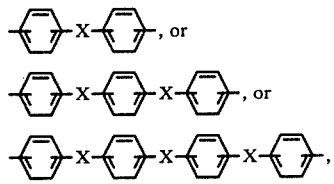

and where X is as previously defined. Examples of suitable compounds of this class include 3-aminophenylacetylene, 3-amino-3'-ethynylbiphenyl, 4-amino-3'-ethynylbiphenyl, 3-amino-4'-ethynyldiphenyl ether and the 3,3' and 4,4' substituted analogues thereof. The compounds shown in U.S. Pat. No. 3,928,450 also may be employed. All of the above noted compounds are known and reported in the art.

In the first step of the process, a solution containing 1 molar portion of a dialkyl ester of the aromatic tetracarboxylic acid (Moiety b) is prepared in a solvent of the type previously described. This is preferably done by adding 1 mol of the appropriate dianhydride to a stirred reactor charged with more than 2 molar portions of an appropriate alkanol. The mixture is heated to react the alkanol with the anhydride groups with the excess alkanol serving as a solvent for the subsequent steps of the process. The solution should be prepared so as to contain the highest feasible solids concentration to minimize the quantity of solvent to be removed in subsequent steps. Solutions containing up to 75 weight % solids at room temperature can be prepared.

In the second step of the process, 0.5 to about 0.8 molar portion of an appropriate aromatic diamine (Moiety A) is mixed with the solution of the dialkyl ester of the tetracarboxylic acid. It is preferred to add the aromatic amine to the previously formed solution in small increments with stirring so that the B moiety is always present in stoichiometric excess to maximize the production of low molecular weight products. The structure of this first intermediate product is defined by the formula:

B(A—B)$_n$ where n is a small integer having a value from 1 to about 4.

The value of n is dependent upon the molar ratio of the A and B moieties as shown below:

| Molar Ratio A/B | Value of n |
|---|---|
| 0.5 | 1 |
| 0.67 | 2 |
| 0.75 | 3 |
| 0.8 | 4 |

Figure 2:
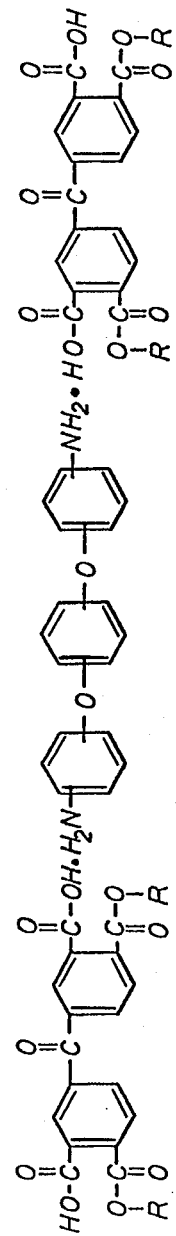

In each of the formulas (1), (2), and (3) the value assigned to n is an average value and individual molecules may have an n value somewhat higher or lower than the average value. In the special case when the A moiety is a 1,3-bis (aminophenoxy) benzene and the B moiety is a dialkyl ester of 3,3'4,4'-benzophenone tetracarboxylic acid—and the moieties are employed in an 0.5/1.0 molar ratio—the first intermediate product has the structure shown in FIG. 2.

The first intermediate product is prepared at a temperature of less than about 50° C. to minimize undesired side reactions, particularly the formation of amide and-/or imide groups. With most of the A and B moieties, the reaction will take place at ambient temperature, e.g., 20°–25° C. To the extent possible, the A moiety should be added to the reaction either without the use of a solvent or as a relatively concentrated solution in a solvent of the type previously described.

In the third step of the process, an appropriate aminoarylacetylene (Moiety C) is mixed with the solution of the second step of the process to form the second intermediate product of Formula (1) previously set forth. The aminoarylacetylene is employed in a quantity sufficient to provide amine groups equivalent to the free carboxylic acid groups present in the intermediate product of Formula (3). The addition is made with stirring while maintaining the reaction temperature below about 50° C. to minimize undesired side reactions. With most C moieties, the reaction will take place at ambient temperature. The C moiety should be added to the reaction either without the use of a solvent or as a relatively concentrated solution in a solvent of the type previously described.

The final two steps of the process consist of (a) removing solvent from the solution of the intermediate product of Formula (1), and (b) heating the intermediate product of Formula (1) under controlled temperature conditions such that essentially all of the carboxylic acid groups, the ester groups, and the amine groups are converted to imide groups and such that no significant percentage of the acetylene groups undergo polymerization to crosslink the product. These two steps can be carried out separately or, in some cases, simultaneously. To avoid significant polymerization of the acetylene, the product should not be heated to a temperature greater than about 210° C. and preferably not greater than about 170° C.

The final two steps of the process as set forth in the paragraph above are extremely critical, particularly in preparing products that will be used to prepare moldings. If any significant quantities of carboxylic acid groups, ester groups or amine groups remain in the products, they will react during molding to liberate water or an alcohol. The water or alcohol thus formed will be volatized and cause blisters and/or voids in the molding. While it is necessary to complete the imidization of the product, it also is necessary to avoid overheating to prevent excessive crosslinking of the acetylene end groups so that the recovered product will have adequate flow for molding. The temperatures employed and the duration of the heating cycles must be properly balanced. Appropriate conditions to be used with specific compositions and equipment can be established with a relatively few tests coupled with instrumental analysis of the product for the presence and concentration of carboxylic acid groups, ester groups, amine groups, amide groups (a possible intermediate group formed in the heating step), imide groups, and acetylene groups.

Where the final two steps of the process are carried out separately, the amine salts are recovered in solid form by evaporating the solvent from the solution. This is preferably carried out by vaporizing the solvent under reduced pressure at ambient temperature or with mild heating. Alternatively, the amine salts can be recovered by spray drying. In this method, the solution is sprayed as fine droplets into a cylindrical column, which droplets fall under gravity through an upwardly flowing supply of heated gas. The temperature of the heated gas and its velocity of flow rate can be controlled so that the minimum quantity of heat is supplied to vaporize substantially all of the solvent present in the droplets. The spray dried salts are recovered in a particulate form.

The dry amine salts then are heated under the controlled temperature conditions previously set forth to convert the carboxylic acid groups, the ester groups, the amine groups, and amide groups to imide groups. The heating preferably is carried out under reduced pressure. The heating can be carried out in shallow pans or alternatively in a fluidized bed.

Where it is desired to carry out the final two steps of the process in a single operation, the solution of the amine salts can be poured into a suitable tray drier and heated, preferably under reduced pressure, until the desired acetylene end-capped polyimide oligomer is formed.

Figure 3:
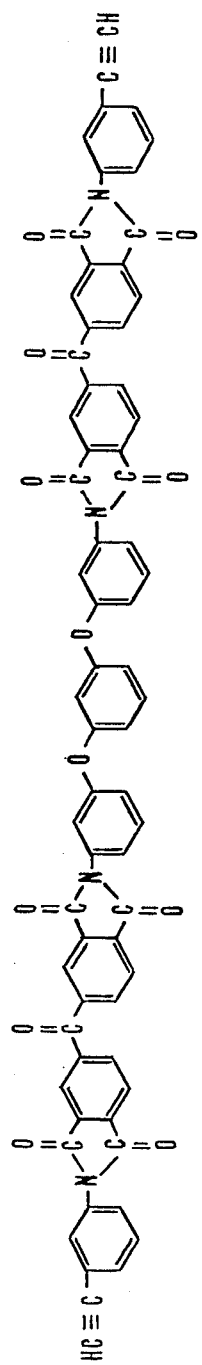
FIG. 3 represents the structural formula of a typical final product produced by the process of the invention.

The final product of process of the invention is an acetylene end-capped polyimide oligomer whose chemical structure is essentially identical to an acetylene end-capped polyimide oligomer prepared from the same A, B, and C moieties by the method disclosed in U.S. Pat. No. 3,845,018. The final product prepared from 0.5 mol of 1,3-bis-(3-aminophenoxy) benzene, 1.0 mol of a dialkyl ester of 3,3'4,4'-benzophenone tetracarboxylic acid, and 1.0 mol of 3-aminophenylacetylene has the structure shown in FIG. 3.

The dried amine salts described in the fourth paragraph above are believed to be novel products not previously available in the art. These finely-divided particulate products are stable and can be shipped to laminators, where they can be redissolved in a wide variety of solvents to form laminating lacquers. They melt at low temperatures and can be applied directly to substrates to form prepregs. They also can be applied to substrates by electrostatic coating techniques.

The following examples are set forth to illustrate the principle and practice of the invention to those skilled in the art. Unless otherwise noted, where parts and percentages are set forth, they are parts and percentages expressed on a weight basis.

EXAMPLE 1

Part A

A reaction vessel equipped with a high powered stirrer was charged with 20 grams (0.44 mol) of ethanol and 32.2 grams (0.1 mol) of 3,3'4,4'-benzophenone tetracarboxylic acid dianhydride (BTDA). The mixture was heated to reflux with stirring until all of the BTDA was esterified to form the diethyl ester of BTDA. The solution was cooled to ambient temperature and had a viscosity of about 2,600 cps at 25° C. A solution of 14.6 grams (0.05 mol) of bis (aminophenoxy) benzene (APB) dissolved in 80 grams of ethanol was added over a period of 15 minutes. The solution thus prepared contained about 35 weight % solids.

The reaction vessel was fitted with a distillation takeoff head and approximately 80 grams of ethanol was removed by vacuum distillation. The resulting solution contained about 75 weight % solids.

Part B

A total of 11.7 grams (0.1 mol) of 3-aminophenylacetylene (APA) was added drop wise with stirring over a period of 15 minutes to the product of Part A. The finished solution contained about 78 weight % solids and had a viscosity of about 75,000 cps at 25° C.

Part C

The solution of Part B was injected onto the rotating flask of a rotary evaporator which was heated to about 90° C. The evaporator was operated at a pressure of about 1 mm of Hg. The recovered product was heated for 20 hours at 130° C. in a vacuum oven to complete the imidization reaction.

Part D

The product of Part C and an acetylene end-capped polyimide oligomer prepared from identical reactants by the conventional prior art process were examined for:
 (a) melting point,
 (b) gel time at 250° C.,
 (c) weight loss as determined by thermal gravimetric analysis,
 (d) shape and temperature of the crosslinking exotherm curve shown by differential scanning calorimetry, and
 (e) aromatic/acetylenic proton ratio as determined by nuclear magnetic resonance spectroscopy.

All of the measured properties were identical or very similar to each other. No significant differences were observed. Moldings prepared from the product of Part C were equivalent to or superior to moldings prepared from the control.

EXAMPLE II

Part A

A methanol solution of a salt was prepared from 2 molar portions of the dimethyl ester of BTDA, 1 molar portion of APB, and 2 molar portions of APA employing the techniques described in Example I, Parts A and B.

Part B

An aliquot of the solution of Part A was diluted to 20 weight % solids with additional methanol and spray dried in a pilot scale spray drier. The salt solution of Part A was introduced into the drier at a rate of about 100 ml/min. The drying air introduced in the spray drier was heated to a temperature of about 190° C. The flow rate was such that the exit temperature of the drying gas was about 125° C. The product was collected in a cyclone as fine yellow particles which could be dissolved readily in methanol.

What is claimed:

1. A process for preparing an acetylene end-capped polyimide oligomer which consists essentially of:
 (a) Preparing a solution containing substantially 1.0 molar equivalent of a dialkyl ester of an aromatic tetracarboxylic acid of structure B in a solvent of the group consisting of lower alkanols containing up to 5 carbon atoms and lower ethers containing up to 6 carbon atoms,
 (b) Mixing substantially about 0.5 to 0.8 molar equivalent of an aromatic diamine of structure A with the solution of step (a) to form a reaction product between components A and B; any solvent employed to dissolve B being selected from the group set forth in (a) above, the reaction temperature in step (b) being maintained below about 50° C.,
 (c) Mixing an aminoarylacetylene of structure C with the solution of step (b) and forming a reaction product thereof, the aminoarylacetylene being added in a quantity sufficient to provide amine groups equivalent to the free carboxylic acid groups present in the product of (b); any solvent employed to dissolve C being selected from the group set forth in (a) above, the reaction temperature in step (c) being maintained below about 50° C.,
 (d) Vaporizing any solvent from the reaction product of step (c), and
 (e) Heating the product of step (d) to a temperature of less than about 210° C. for a period of time sufficient to convert substantially all of the carboxylic acid and ester groups of B moieties and the amine groups of A and C moieties to imide groups; where A has the structure:
 (a) $H_2N-Ar-NH_2$,
where Ar is a phenyl, or naphthyl group, or

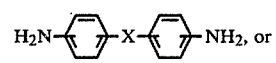  (b)

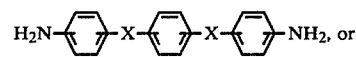  (c)

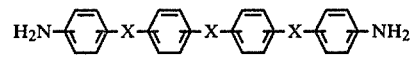  (d)

where X is

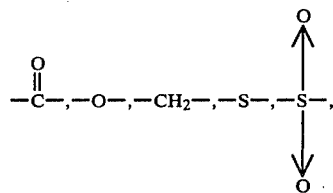

—$CF_2$—, or a bond,
where B has the structure:

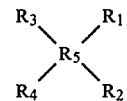

where $R_5$ has the structure

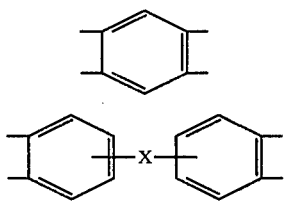

where X is as defined above, where one of $R_1$ and $R_2$ and one of $R_3$ and $R_4$ is a

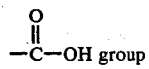

and the other is a

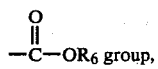

where $R_6$ is a lower alkyl group containing up to 5 carbon atoms, and where C has the structure:

$$H_2N-Arylene-C\equiv CH$$

where Arylene is a phenylene group, a naphthalene group, or

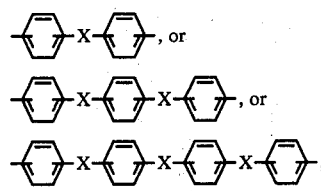

and where X is as defined above.

2. A process of claim 1 in which, in step (b), the aromatic diamine is added in small increments with stirring to the solution of step (a).

3. A process of claim 1 in which step (d) is carried out by spray drying the reaction product of step (c).

4. A process of claim 2 in which step (d) is carried out by spray drying the reaction product of step (c).

5. A process of claim 1 in which the solvent employed in the process is an alkanol.

6. A proces of claim 2 in which the solvent employed in the process is an alkanol.

7. A process of claim 1, 2, 3, 4, 5, or 6 in which the A moiety is a bis (aminophenoxy) benzene.

8. A process of claim 1, 2, 3, 4, 5, or 6 in which the B moiety is a diester of 3, 3', 4, 4'-benzophenone tetracarboxylic acid.

9. A process of claim 1, 2, 3, 4, 5, or 6 in which the C moiety is an aminophenylacetylene.

10. A process of claim 1, 2, 3, 4, 5, or 6 in which the A moiety is a bis (aminophenoxy) benzene, the B moiety is a diester of 3,3',4,4'-benzophenone tetracarboxylic acid, and the C moiety is an aminophenylacetylene.

11. A process of claim 1 in which the heating of product in step (e) is carried out under reduced pressure.

12. A process of claim 2 in which the heating of product in step (e) is carried out under reduced pressure.

13. A process of claim 11 or 12 in which step (d) is carried out spraying the solution of step (c) as droplets into a cylindrical column and permitting them to fall under gravity through an upwardly flowing supply of heated gas with the gas temperature and its flow rate being controlled so that the minimum quantity of heat is supplied to vaporize substantially all of the solvent from said droplets.

14. A process for preparing a precursor of an acetylene end-capped polyimide oligomer in a dry particulate form that is soluble in lower alkanols containing up to 5 carbon atoms and lower ethers containing up to 6 carbon atoms, which consists essentially of:

(a) Preparing a solution containing substantially 1.0 molar equivalent of a dialkyl ester of an aromatic tetracarboxylic acid of structure B in a solvent of the group consisting of lower alkanols containing up to 5 carbon atoms and lower ethers containing up to 6 carbon atoms, (b) Mixing substantially about 0.5 to 0.8 molar equivalent of an aromatic diamine of structure A with the solution of step (a) to form a reaction product between components A and B; any solvent employed to dissolve B being selected from the group set forth in (a) above, the reaction temperature in step (b) being maintained below about 50° C., (c) Mixing an aminoarylacetylene of structure C with the solution of step (b) and forming a reaction product thereof, the aminoarylacetylene being added in a quantity sufficient to provide amine groups equivalent to the free carboxylic acid groups present in the product of (b); any solvent employed to dissolve C being selected from the group set forth in (a) above, the reaction temperature in step (c) being maintained below about 50° C., (d) Spraying the solution of step (c) as droplets into a cylindrical column and permitting them to fall under gravity through an upwardly flowing supply of heated gas with the gas temperature and its flow rate being controlled so that the minimum quantity of heat is supplied to vaporize substantially all of the solvent from said droplets, and (e) Recovering the amine salts in a particulate form that is soluble in a lower alkanol containing up to 5 carbon atoms or a lower ether containing up to 6 carbon atoms;

where A has the structure:

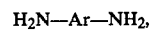          (a)

where Ar is a phenylene or naphthylene group, or

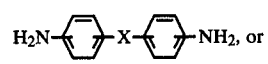          (b)

          (c)

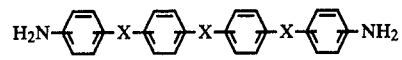          (d)

where X is

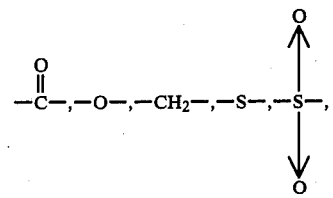

$-CF_2-$, or a bond,
where B has the structure:

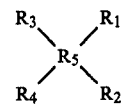

where $R_5$ has the structure or

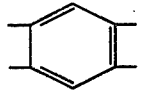

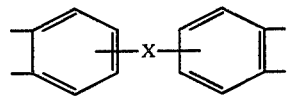

where X is as defined above, where one of $R_1$ and $R_2$ and one of $R_3$ and $R_4$ is

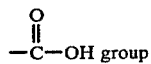

and the other is a

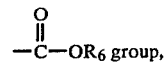

where $R_6$ is a lower alkyl group containing up to 5 carbon atoms, and where C has the structure:

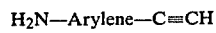

where Arylene is a phenylene group, a naphthylene group, or

 (i)

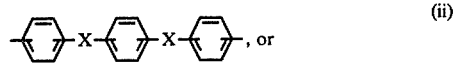 (ii)

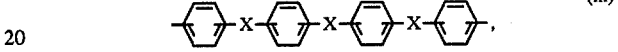 (iii)

and where X is as defined above.

15. A dry particulate precursor of an acetylene endcapped polyimide oligomer prepared by the process of claim 14.

* * * * *